US 6,681,560 B2

(12) United States Patent
Friedlander, III et al.

(10) Patent No.: US 6,681,560 B2
(45) Date of Patent: Jan. 27, 2004

(54) NOZZLE THROAT AREA CONTROL APPARATUS AND METHOD

(75) Inventors: Mark P. Friedlander, III, Centerville, VA (US); Michael D. Allen, Manassas, VA (US); Stephen H. Tse, Jr., Dale City, VA (US); Roger S. Snyder, Front Royal, VA (US); Guy B. Spear, Orlean, VA (US)

(73) Assignee: Atlantic Research Corporation, Gainesville, VA (US)

( * ) Notice: Subject to any disclaimer, the term of this patent is extended or adjusted under 35 U.S.C. 154(b) by 39 days.

(21) Appl. No.: 10/038,858

(22) Filed: Jan. 8, 2002

(65) Prior Publication Data

US 2003/0126861 A1 Jul. 10, 2003

(51) Int. Cl.$^7$ .................................. F02K 1/06
(52) U.S. Cl. .............................. 60/228; 60/256; 60/771; 239/265.37
(58) Field of Search .................... 60/228, 230, 242, 60/256, 771; 239/265.19, 265.37

(56) References Cited

U.S. PATENT DOCUMENTS

| 2,593,420 A | | 2/1952 | Diehl | |
| 2,694,898 A | | 11/1954 | Stauff | |
| 2,968,919 A | * | 1/1961 | Hughes et al. | 239/265.37 |
| 3,059,425 A | * | 10/1962 | McShrry et al. | 60/242 |
| 3,173,252 A | * | 3/1965 | Ziegenhagen | 60/256 |
| 3,182,450 A | | 5/1965 | Widell et al. | |
| 3,192,709 A | * | 7/1965 | Hardy | 239/265.19 |
| 3,194,014 A | * | 7/1965 | Wilson | 239/265.37 |
| 3,534,831 A | | 10/1970 | Nagamatsu et al. | |
| 3,568,794 A | | 3/1971 | Hilbig | |
| 3,659,789 A | | 5/1972 | Schultz | |
| 3,743,184 A | * | 7/1973 | Mancus | 239/265.19 |
| 3,749,317 A | | 7/1973 | Osofsky | |
| 3,760,589 A | * | 9/1973 | Puckett et al. | 239/265.19 |
| 4,274,610 A | | 6/1981 | Bastian | |
| 4,384,694 A | | 5/1983 | Watanabe et al. | |
| 5,110,047 A | | 5/1992 | Toews | |
| 5,125,596 A | | 6/1992 | Cavalleri | |

FOREIGN PATENT DOCUMENTS

JP          JO 3005-700 A        1/1991

* cited by examiner

*Primary Examiner*—Michael Koczo
(74) *Attorney, Agent, or Firm*—Nixon & Vanderhye, P.C.; Frank P. Presta

(57) ABSTRACT

Control apparatus for a nozzle for a rocket or other vehicle having a combustion chamber with a propellant therein in communication with the nozzle, the nozzle having a throat and a pair of bores extending into the throat The bores may be in opposed or any other suitable relation. A pair of plungers are slidably mounted in the bores and are movable between an open position wherein they are disposed outside of the throat and a closed position wherein they extend into the throat to substantially close it. The plungers have a width or diameter substantially the same as the width or diameter of the throat. Actuator devices are provided for moving the plungers independently of each other to control thrust by controlling the flow of combustion gases through the throat and the pressure in the combustion chamber. The movement of the plungers can also be used for thrust vector control.

15 Claims, 4 Drawing Sheets

NOZZLE THROAT AREA CONTROL APPARATUS AND METHOD

BACKGROUND AND SUMMARY OF THE INVENTION

The present invention relates generally to a new and improved nozzle throat area control apparatus and method and, more particularly, to such an apparatus and method for controlling both thrust level and thrust vector angle in a rocket motor or other similar propulsion device.

U.S. Pat. No. 2,968,919 to Hughes et al. discloses a variable area nozzle having a plurality of circumferentially spaced vanes in the nozzle throat, with means being provided to position the vanes within the throat and restrict fluid flow therethrough in response to changes in pressure upstream from the throat. In operation, pressure within the combustion chamber is delivered to a chamber on one side of a piston connected to each vane. When the combustion pressure exceeds the force of a compression spring on the other side of the piston, the vanes are moved radially outwardly to reduce their restriction of fluid flow through the throat of the nozzle. As the combustion pressure is reduced, the springs will move the vanes inwardly to restrict fluid flow through the nozzle throat. The nozzle construction of Hughes et al. is subject to certain disadvantages. First, the actuation system for the vanes must be constructed to handle the hot combustion gases that are conveyed to the piston for each vane. Second, the vanes are of a size, positioning and construction such that they are not capable of moving far enough into the nozzle throat area to close it or severely restrict it. Third, the vanes are not independently movable and cannot be selectively controlled for specific operations.

The patent to Mancus, U.S. Pat. No. 3,743,184, discloses a variable area nozzle construction utilizing four blades that can be radially moved into and out of the nozzle throat area. Each of the blades is also rotatable to provide thrust vector control. The nozzle construction of Mancus is subject to certain disadvantages. First, it is necessary to move the blades both radially and to rotate them to obtain both throat area and vector control. This results in a more complicated construction for effecting movement of each blade. Second, the blades are substantially smaller than the size of the nozzle throat area and thus are not capable of severely restricting or substantially closing flow through the nozzle throat area in cases where this may be necessary or desirable.

The new and improved nozzle throat area control apparatus and method are not subject to any of the above-described disadvantages of the devices in the Hughes et al. and Mancus patents, or of other nozzle throat area control systems previously or currently used or in the prior art. Additionally, the nozzle throat area control apparatus and method of the present invention possess many advantages that are not found in the prior art.

SUMMARY OF THE INVENTION

The nozzle throat area control apparatus of the present invention comprises a pair of plungers that are slidably mounted in the nozzle housing adjacent the throat thereof. The plungers may be in opposed or other suitable relation, and are of a size that is substantially equal to the size of the nozzle throat so that the plungers may be moved into the nozzle throat to severely restrict the flow of combustion gases therethrough or to substantially close the throat.

The plungers are independently movable by any suitable means, such as gas generating devices, mechanical, electro-mechanical, hydraulic or pneumatic actuating devices. The independent movement of the plungers can be used to effect thrust vector control as well as thrust level or combustion chamber pressure control.

In one embodiment, a dual level apparatus is provided in which gas generating devices are used to move the plungers from outer positions to inner positions to restrict flow through the nozzle throat after a predetermined period of operation. In a second embodiment, actuators are used for variable control of the positions of the plungers depending on the combustion chamber pressure desired or the thrust vector control desired. In a third embodiment, means are provided for reigniting the propellant after a predetermined period after which burning has been terminated, and actuating means are provided for the plungers to move them to desired positions to control burning of the propellant and thrust vector control during the initial period of burning and the re-ignition period.

The new and improved nozzle throat area control apparatus and method of the present invention is simple in construction, reliable in operation and operable to provide more uniform thrust, when desired, by effectively controlling the propellant combustion chamber pressure by selectively restricting flow through the nozzle throat area. By independent movement of the plungers, thrust vector control can also be easily effected.

DESCRIPTION OF THE PREFERRED EMBODIMENTS

Figure 1:
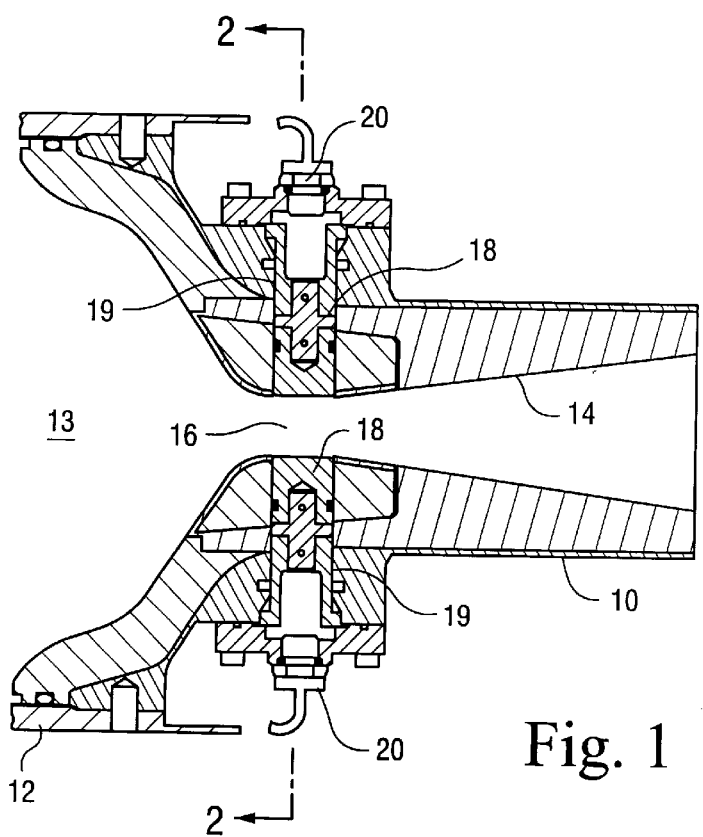
FIG. 1 is a side elevational view in section, with parts broken away, of a first embodiment of the nozzle throat area control apparatus of the present invention.
Figure 2:
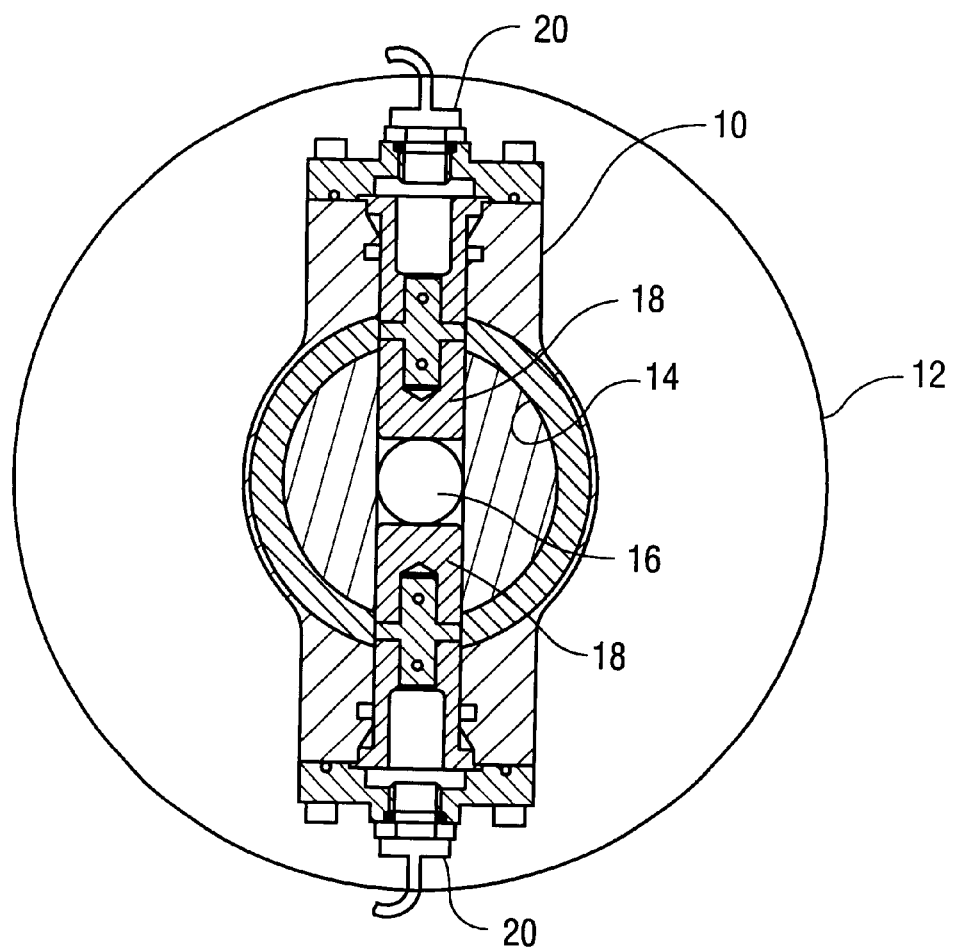
FIG. 2 is a sectional view taken substantially along like 2—2 in FIG. 1, showing the plungers in outer or open positions.

Referring to FIGS. 1 and 2, which illustrate a first embodiment of the present invention, the nozzle housing 10 is connected in any suitable manner to a propellant housing 12, such as a rocket motor case, containing a propellant (not shown) of any suitable type, such as solid or liquid propellant. The nozzle 10 and propellant housing 12 may be formed of any suitable materials and may be of any desired configuration. The nozzle housing 10 defines a nozzle 14 having a throat 16. In operation, combustion gases from the combustion chamber 13 generated by the burning propellant flow through the nozzle throat 16 and out of the diverging nozzle 14 for the purpose of providing thrust for the propulsion of the rocket motor or similar vehicle.

A pair of plungers 18 are slidably mounted within bores 19 in the nozzle housing 10 adjacent the nozzle throat 16 which may be of any desired or suitable shape. The bores 19 may be in opposed or any other suitable relation to each other. Each plunger 18 is of a size substantially the same as that of the nozzle throat 16 and is independently movable between the open position shown in FIG. 2 and the closed position shown in FIG. 3. In the case of a round nozzle throat 16, each plunger 18 would have a width or diameter the same as that of the diameter of the nozzle throat. In the case of a nozzle throat 16 having a shape other than round, each plunger 18 would have a width the same as that of the nozzle throat so as to be capable of substantially closing it when in the inner position shown in FIG. 3.

The plungers 18 may be mounted in the bores 19 for movement substantially transverse to or at another desired angle to the centerline of the nozzle throat.

Figure 3:
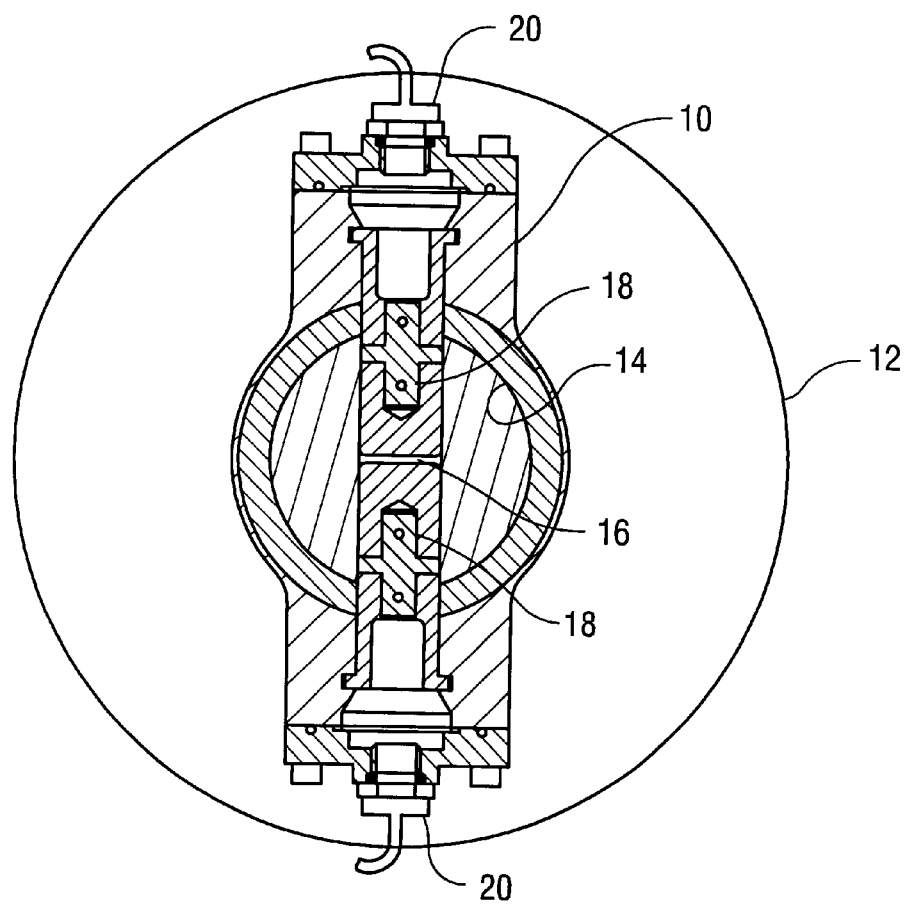
FIG. 3 is a view similar to FIG. 2 showing the plungers in the inner or closed positions in the nozzle throat.

Any suitable actuating device may be used to move the plungers 18 between the open position of FIG. 2 and the closed position of FIG. 3. Preferably, gas generating squibs 20 are used to effect rapid movement of the plungers 18 from the open position of FIG. 2 to the closed position of FIG. 3. Other actuating devices, such as mechanical, electro-mechanical, hydraulic or pneumatic devices may be used.

FIGS. 1–3 illustrate the first embodiment of the present invention wherein a dual area control of the nozzle throat 16 is effected. Initially, the plungers 18 are in the open position of FIG. 2. After a predetermined period of burning of the propellant within the combustion chamber 13 and a decrease in pressure within the combustion chamber 13, squibs 20 of any suitable construction are actuated to generate gas to move the plungers inwardly to the inner position of FIG. 3 wherein they severely restrict flow of combustion gases through the nozzle throat 16 and increase the pressure within the combustion chamber 13 to effect more uniform burning of the propellant and more uniform thrust at a lower level than the initial propellant thrust.

The plungers 18 may be formed of any suitable shape or construction, and of a suitable heat-resistant material such as tungsten, carbon/carbon, coated carbon/carbon, refractory metals, or high temperature ceramics.

Figure 4:
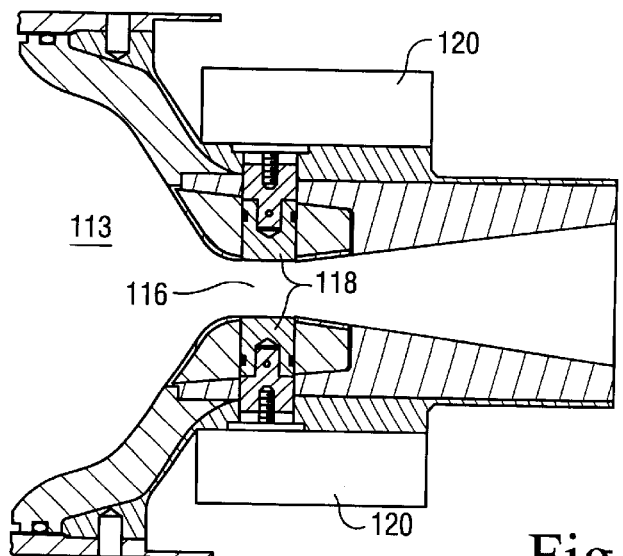
FIG. 4 is a side elevational view in section, with parts broken away, of a second embodiment of the present invention.

FIG. 4 illustrates a second embodiment of the present invention that is similar to that shown in FIGS. 1–3, with the exception that the second embodiment utilizes variable actuating devices 120 for the plungers 118 so that the plungers can be moved independently into and out of the nozzle throat 116 for effecting variable thrust levels by controlling pressure within the combustion chamber 113 and also thrust vector control by moving one of the plungers into the nozzle throat to a different position than the opposite plunger. The variable actuating devices 120 may be of any suitable construction and operation, and may be mechanical, electro-mechanical, hydraulic, pneumatic or gas generating devices. The variable actuating devices 120 are constructed to move the plungers 118 independently to any desired position between the open position of FIG. 2 and the substantially closed position of FIG. 3. Any suitable control means (not shown) may be used to operate the variable actuating devices 120.

Figure 5:
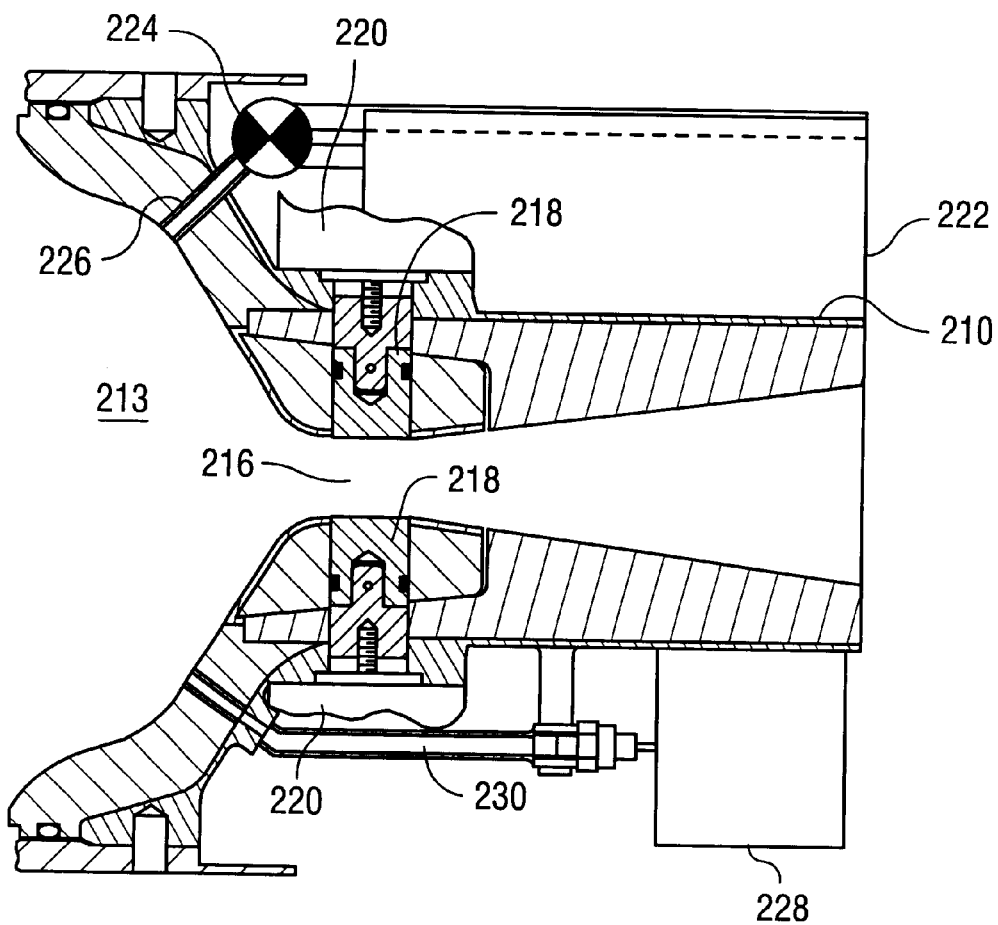
FIG. 5 is a side elevational view in section, with parts broken away, of a third embodiment of the present invention.

FIG. 5 illustrates a third embodiment of the present invention which is similar to that shown in FIG. 4 in that variable actuating devices 220 are provided for moving the pistons 218 independently to any desired positions in the nozzle throat 216 between the open positions shown in FIG. 2 and the substantially closed positions shown in FIG. 3 for the purpose of effecting thrust level control and/or thrust vector control.

The third embodiment of FIG. 5 further comprises a gas generator device 222 of any suitable construction which is mounted on the nozzle housing 210. The gas generating device is connected to an exhaust valve 224 that is in turn connected to a tube 226 extending into the combustion chamber 213. In this manner, a start-restart operation can be effected. When the initial burning of the propellant in the combustion chamber 213 is terminated in any suitable or desired manner to effect the "coasting" of the rocket or other vehicle by its own momentum, the propellant in the combustion chamber 213 can be restarted after a predetermined period by actuating the gas generator 222 to generate hot gases that flow through the exhaust valve 224 and through the tube 226 into the combustion chamber 213 to reignite the propellant therein. After re-ignition of the propellant, the plungers 218 can be controlled in the manner hereinbefore described to tailor the burning of the propellant, the thrust levels and vector control.

As also shown in FIG. 5, the third embodiment may additionally comprise a pressure feedback control module 228 or the like which is in communication with the pressure in the combustion chamber 213 through a tube 230. The control module 228 is connected to the variable actuator devices 220 to control them in accordance with the combustion chamber pressure sensed by the control module.

From the foregoing description, it will be readily seen that the new and improved nozzle throat area control apparatus is simple in construction and reliable in operation such that it can effectively control the thrust level by restricting flow through the nozzle throat to control the pressure in the combustion chamber, and also to control the thrust vector angle by independently moving the plungers into the nozzle throat. Additionally, the plungers can be moved to a substantially closed position wherein they severely restrict or prevent significant flow through the nozzle throat.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. Control apparatus for a nozzle for a rocket or other vehicle having a combustion chamber with a propellant therein in communication with the nozzle, said nozzle having a throat and a pair of bores extending onto said throat;

a pair of plungers slidably mounted in said bores and being movable between an open position wherein they are disposed outside of said throat and a closed position wherein they extend into said throat to substantially close said throat, said plungers having a width or diameter substantially the same as the width or diameter of said throat; and actuator devices for moving said plungers independently of each other to control thrust by controlling the flow of combustion gases through said throat and the pressure in the combustion chamber.

2. The control apparatus of claim 1 wherein said bores are on opposite portions of said throat.

3. The control apparatus of claim 2 wherein said bores are substantially radially or transversely aligned relative to said throat.

4. The control apparatus of claim 1 wherein said actuator devices are operable to move one plunger into said throat a larger amount than the other plunger to control the direction of combustion gases through the nozzle for thrust vector control.

5. The control apparatus of claim 1 wherein said actuator devices are gas generating devices for moving said plungers from said open position to a second position near said closed position to restrict the flow of combustion gases through said throat after a predetermined time period of burning of the propellant in the combustion chamber.

6. The control apparatus of claim 1 wherein said actuator devices are constructed to selectively move said plungers to various positions between said open position and said closed position for variable thrust control by controlling the flow of combustion gases through said throat and thus the pressure in the combustion chamber and burning of the propellant therein.

7. The control apparatus of claim 1 wherein said throat is circular in cross-section and said plungers are cylindrical in shape.

8. The control apparatus of claim 1, further comprising a pressure feedback control module for controlling said actuator devices, and control module being in fluid communication with the combustion chamber.

9. The control apparatus of claim 1, further comprising a gas generator mounted on said nozzle and being in fluid communication with said combustion chamber, said gas generator being operable to reignite the propellant in the combustion chamber after the cessation of the initial burning thereof.

10. A method of controlling the thrust of a rocket or other vehicle having a combustion chamber with a propellant therein, said rocket having a nozzle with a throat in communication with the combustion chamber, comprising:

moving a pair of spaced plungers into said throat, said plungers having a width or diameter substantially the same as the width or diameter of said throat so as to be movable to a closed position wherein they substantially close said throat, and providing actuator devices for moving said plungers independently of each other to control the flow of combustion gases through said throat and the pressure in the combustion chamber.

11. The method of claim 10 wherein said plungers are in opposed relation.

12. The method of claim 11 wherein said plungers are radially or transversely aligned relative to said throat.

13. The method of claim 10, further comprising moving one of said plungers into said throat a greater distance than the other plunger for thrust vector control.

14. The method of claim 10 comprising the additional step of controlling said actuator devices with a pressure feedback module in fluid communication with the combustion chamber.

15. The method of claim 10, further comprising providing a gas generator in fluid communication with the combustion chamber to restart the propellant in the combustion chamber after an initial period of the burning thereof.

* * * * *